United States Patent
Shirasago et al.

(10) Patent No.: US 11,519,493 B2
(45) Date of Patent: Dec. 6, 2022

(54) SHIFT CONTROL SYSTEM FOR AUTOMATIC TRANSMISSION

(71) Applicant: Mazda Motor Corporation, Hiroshima (JP)

(72) Inventors: Toshiaki Shirasago, Aki-gun (JP); Tomohiro Okubo, Aki-gun (JP); Shoji Abe, Aki-gun (JP); Hideyuki Nishi, Aki-gun (JP); Hajime Oyama, Aki-gun (JP); Kiminori Higo, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 164 days.

(21) Appl. No.: 17/177,448

(22) Filed: Feb. 17, 2021

(65) Prior Publication Data

US 2021/0310556 A1  Oct. 7, 2021

(30) Foreign Application Priority Data

Apr. 1, 2020 (JP) .............................. JP2020-065470

(51) Int. Cl.
*F16H 59/02* (2006.01)
*F16H 59/44* (2006.01)
(Continued)

(52) U.S. Cl.
CPC ......... *F16H 59/0204* (2013.01); *B60K 20/06* (2013.01); *B60K 35/00* (2013.01); *F16H 59/044* (2013.01); *F16H 59/44* (2013.01); *B60K 2370/1434* (2019.05); *B60K 2370/172* (2019.05); *F16H 2059/0221* (2013.01)

(58) Field of Classification Search
CPC ............. F16H 2059/0221; F16H 59/44; F16H 59/044; F16H 59/0204; B60K 2370/172; B60K 2370/1434; B60K 35/00; B60K 20/06

See application file for complete search history.

(56) References Cited

U.S. PATENT DOCUMENTS 10,836,387 B2 * 11/2020 Kishi ................. F16H 61/0059
11,384,832 B1 * 7/2022 Bakalas ................. F16H 59/08
(Continued)

FOREIGN PATENT DOCUMENTS

JP          3630603 B2     3/2005

*Primary Examiner* — David M Fenstermacher
(74) *Attorney, Agent, or Firm* — Alleman Hall Creasman & Tuttle LLP (57) ABSTRACT

A shift control system for an automatic transmission is provided, which is mounted on a vehicle configured to be started by an ignition switch being turned on, where an automatic transmission mode or a manual transmission mode is selectively set. The system includes a shift switch through which a manual transmission command for arbitrarily changing a gear stage of the automatic transmission can be inputted in the manual transmission mode, and a controller. The manual transmission mode includes a first manual mode in which the gear stage is changed and maintained by inputting the manual transmission command using the shift switch, and a second manual mode in which the automatic transmission mode is resumed by satisfying a resuming condition after the gear stage is changed. When the ignition switch is turned on, the controller selects in advance the second mode to be set to the automatic transmission.

20 Claims, 4 Drawing Sheets

(51) Int. Cl.
    *B60K 35/00*    (2006.01)
    *B60K 20/06*    (2006.01)
    *F16H 59/04*    (2006.01)

(56)          References Cited

U.S. PATENT DOCUMENTS

| | | | |
|---|---|---|---|
| 2020/0088294 A1* | 3/2020 | Kamio | F16H 59/0204 |
| 2020/0116254 A1* | 4/2020 | Ichikawa | F16H 61/12 |
| 2020/0247426 A1* | 8/2020 | Rafferty | B60W 50/082 |
| 2020/0362961 A1* | 11/2020 | Harada | F16H 59/18 |
| 2022/0034400 A1* | 2/2022 | Miller | F16H 61/32 |
| 2022/0243804 A1* | 8/2022 | Peters | F16H 63/42 |
| 2022/0243808 A1* | 8/2022 | Amano | F16H 63/50 |
| 2022/0282785 A1* | 9/2022 | Peters | B60K 35/00 |

\* cited by examiner

SHIFT CONTROL SYSTEM FOR AUTOMATIC TRANSMISSION

TECHNICAL FIELD

The present disclosure relates to a shift control system of an automatic transmission.

BACKGROUND OF THE DISCLOSURE

Conventional automatic transmissions can be set in a parking range which is used when parking a vehicle, a reverse range which is used when moving the vehicle rearward, a neutral range which is used when not transmitting a drive force to the vehicle, and a drive range (automatic transmission mode) which is used when automatically changing a gear stage.

On the other hand, there is a demand for manually changing the gear stage of the automatic transmission, for example, in order to start the vehicle in second gear. In order to meet this demand, for example, JP3630603B2 proposes a control device for an automatic transmission provided with a manual mode (manual transmission mode). When the control device of the automatic transmission is set to the manual mode, one can upshift or downshift the gear stage by operating a shift switch provided in a steering wheel, for example. Therefore, when the vehicle is stopped, the second-gear start is possible by switching the gear stage to the second gear by an upshift.

In addition, there is a demand for temporarily using the manual mode, for example, until the vehicle stops. In order to meet this demand, the control device for the automatic transmission may have a normal manual mode in which the gear stage is maintained after it is manually switched, and a temporary manual mode in which, after the gear stage is manually switched, the range is switched to the drive range when a given condition is satisfied (e.g., the vehicle speed becomes zero after it exceeds a given threshold). This temporary manual mode maintains the gear stage at the 2nd gear unless the vehicle speed exceeds the given threshold (e.g., 20 km/h) so that the vehicle can keep stopping in a state where the gear stage is switched to the second gear.

The control device for the automatic transmission provided with the normal manual mode and the temporary manual mode is generally configured so that one can select any one of the modes, for example, by operating a select lever to which a manual range where the normal manual mode can be set is added, and the shift switch. However, such an operation for selecting the normal manual mode or the temporary manual mode is complicated, and it may lead to an erroneous operation by the driver.

Therefore, the mode is desirably set with a simple operation by selecting in advance the mode to be set (the normal manual mode or the temporary manual mode).

Moreover, in the control device, operation will not be complicated if the mode is set to the temporary manual mode as much as possible. When the control device is set to the normal manual mode, the driver is suitably required for an operation of an upshift or a downshift of the gear stage by using the shift switch. On the other hand, when the control device is set to the temporary manual mode, although the driver is temporarily required for the operation of the upshift or the downshift of the gear stage by using the shift switch, once the vehicle stops, he/she can operate in the conventional drive range thereafter. Therefore, since the temporary manual mode is not complicated in the operation compared with the normal manual mode, it is a mode in which the driver who is familiar to the operation of the vehicle on which the conventional automatic transmission is mounted can operate easily.

SUMMARY OF THE DISCLOSURE

Therefore, the present disclosure is made in view of the above situation, and one purpose thereof is to provide a shift control system for an automatic transmission which selects in advance, among a first manual mode (a normal manual mode) and a second manual mode (a temporary manual mode), the second manual mode to be set, when an ignition switch is turned on.

According to one aspect of the present disclosure, a shift control system for an automatic transmission, mounted on a vehicle configured to be started by an ignition switch being turned on, where one of an automatic transmission mode and a manual transmission mode is selectively set, is provided. The system includes a shift switch through which a manual transmission command for arbitrarily changing a gear stage of the automatic transmission can be inputted in the manual transmission mode. The manual transmission mode includes a first manual mode in which the gear stage is changed and maintained by inputting the manual transmission command using the shift switch, and a second manual mode in which the automatic transmission mode is resumed by satisfying a resuming condition after the gear stage is changed. The system includes a controller configured to select in advance either one of the first manual mode and the second manual mode to be set, the controller selecting in advance the second manual mode to be set to the automatic transmission when the ignition switch is turned on.

According to the present disclosure, the shift control system for the automatic transmission sets the second manual mode to the automatic transmission mode when the ignition switch is turned on. Therefore, a driver can easily operate the vehicle in the second manual mode in which the complicated operation is not need.

DETAILED DESCRIPTION OF THE DISCLOSURE

Hereinafter, one embodiment of a shift control system for an automatic transmission according to the present disclosure is described with reference to the accompanying drawings.

1: Configuration of Vehicle

Figure 1:
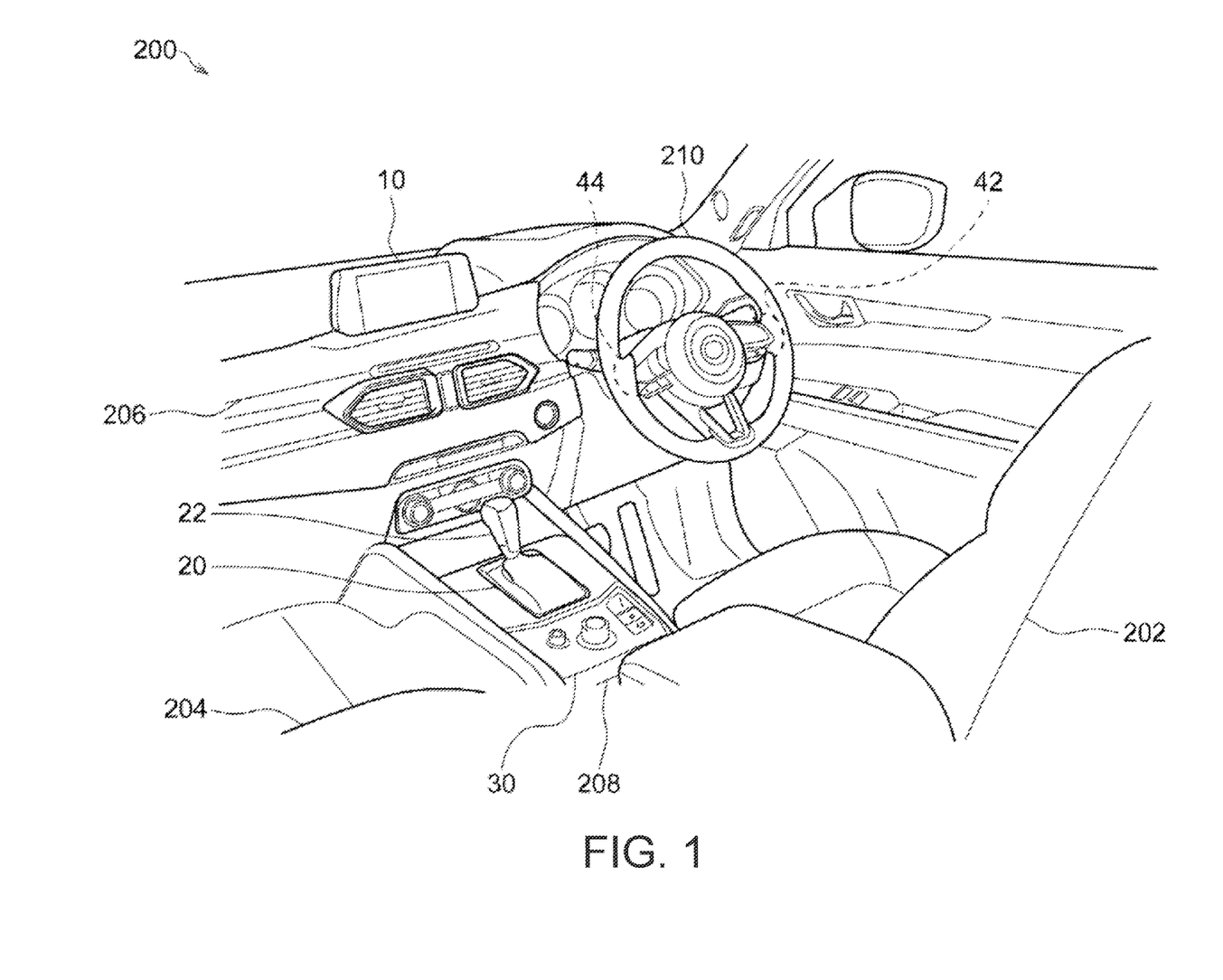
FIG. 1 is a schematic view illustrating inside a cabin of a vehicle on which a shift control system for an automatic transmission according to one embodiment of the present disclosure is mounted.

FIG. 1 illustrates inside a cabin of a vehicle 200 on which the shift control system for the automatic transmission is mounted. The vehicle 200 includes a driver's seat 202 where a driver who operates the vehicle 200 is seated, a passenger seat 204 disposed at a symmetrical location with the driver's seat 202 in the vehicle width direction, an instrument panel 206 disposed in front of the driver's seat 202 and the passenger seat 204 and extending in the vehicle width direction, a center console 208 disposed between the driver's seat 202 and the passenger seat 204, and a substantially circular steering wheel 210 provided in the instrument panel 206 on the driver's seat 202 side and by which a steering command of the vehicle 200 can be inputted. Although the illustrated driver's seat 202 and steering wheel 210 are disposed on the right side in the vehicle width direction, they may be disposed on the left side in the vehicle width direction.

In this embodiment, the vehicle 200 is provided with a liquid crystal display 10 in a center part of the instrument panel 206 in the vehicle width direction. The liquid crystal display 10 displays, for example, an operation screen for an audio function (not illustrated), an operation screen for a navigation function (not illustrated), and a mode selection screen for selecting in advance or reserving either a manual mode (first manual mode or normal manual mode) or a direct mode (second manual mode or temporary manual mode), which will be described later, being to be set.

The vehicle 200 is provided with a selector part 20 in the center console 208, by which a setting command to a parking range, a reverse range, a neutral range, and a drive range can be inputted. The selector part 20 has a select lever 22 extending in the up-and-down direction of the vehicle 200 so that the driver who is seated on the driver's seat 202 can grab it.

Figure 2:
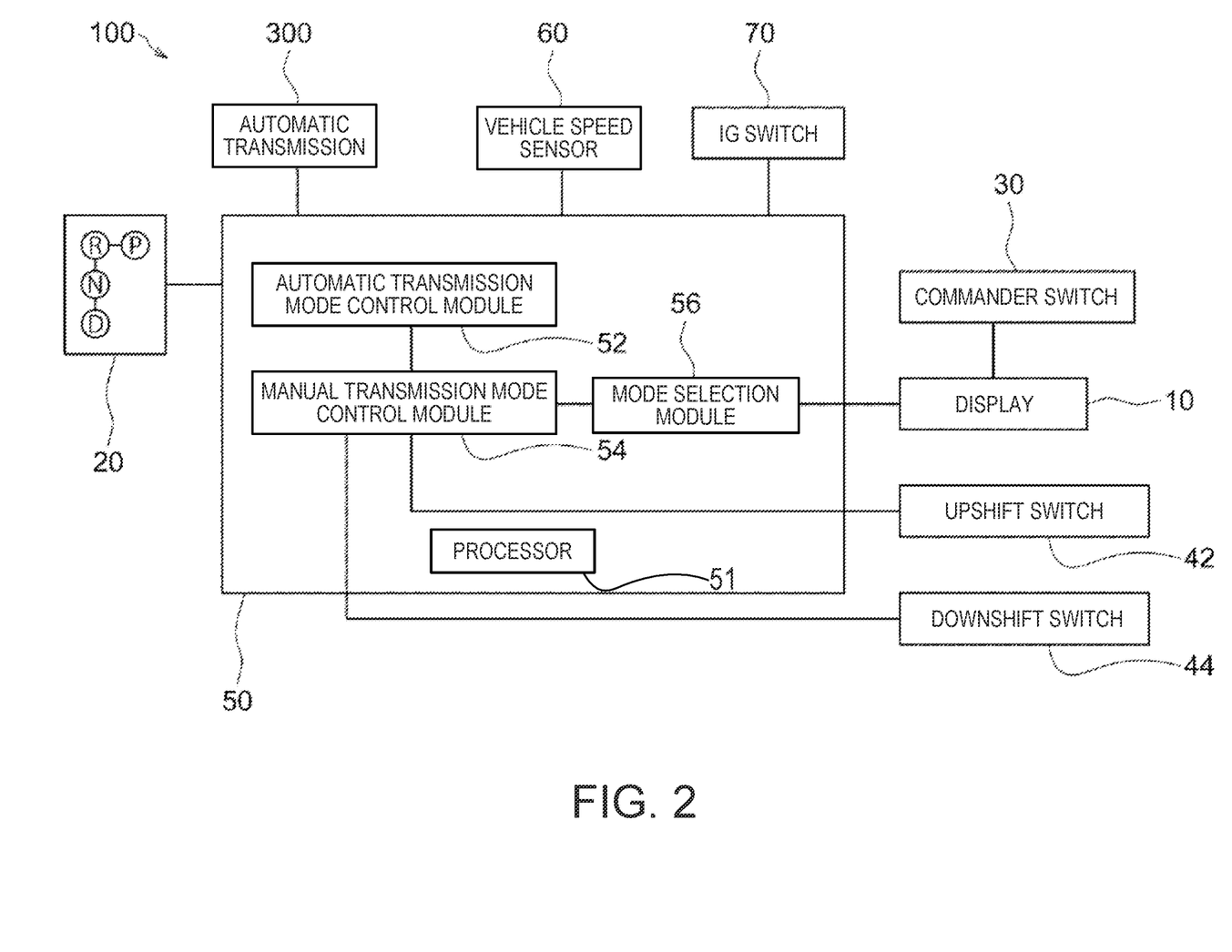
FIG. 2 is a control block diagram of the shift control system illustrated in FIG. 1.

In this embodiment, the selector part 20 has four range positions corresponding to the parking range, the reverse range, the neutral range, and the drive range (see FIG. 2). The range positions of the reverse range, the neutral range, and the drive range are disposed from the front to the rear of the vehicle 200 in this order. Moreover, the range position of the parking range is disposed adjacent to the range position of the reverse range so that it is located on the driver's seat 202 side of the range positions of the reverse range, the neutral range, and the drive range. The select lever 22 illustrated in FIG. 1 is movable to each range position, while being guided by a guide part (not illustrated) provided inside the selector part 20. Moreover, the selector part 20 is provided with a position sensor (not illustrated) which detects a range position at which the select lever 22 is positioned, and outputs the detected range position to a control unit (controller) 50 (described later) as an electrical signal.

Returning to FIG. 1, the vehicle 200 is provided with a commander switch 30 which is disposed in the center console 208 at a location rearward of the selector part 20 and by which an operation command of a screen displayed on the liquid crystal display 10 can be inputted. The combination of the commander switch 30 and the display 10 is one example of a mode input device.

Figure 3:
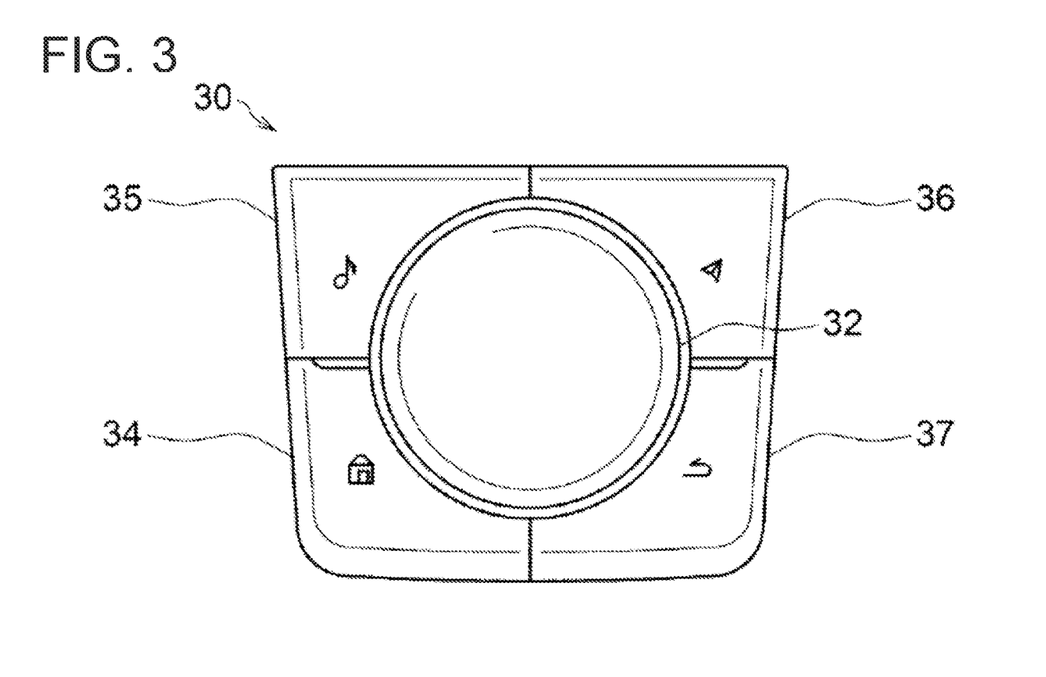
FIG. 3 is a schematic view of a commander switch illustrated in FIG. 1.

As illustrated in FIG. 3, the commander switch 30 includes a commander knob 32 by which a selection command and a decision command can be inputted on the screen displayed on the liquid crystal display 10, a home screen switch 34 by which a command for displaying a home screen (not illustrated) on the liquid crystal display 10 can be inputted, an audio screen switch 35 by which a command for displaying an operation screen of the audio function can be inputted, a navigation screen switch 36 by which a command for displaying an operation screen of the navigation function can be inputted, and a return switch 37 by which a command for displaying the previous screen can be inputted.

In this embodiment, the commander knob 32 is configured to generate the input of the selection command by being rotated about an axis in the up-and-down direction of the vehicle 200 or by being tilted in the front-and-rear direction of the vehicle 200, and generate the input of the decision command by being pushed in the up-and-down direction of the vehicle 200.

Returning to FIG. 1, the vehicle 200 includes an upshift switch 42 in a right end part of a rear surface of the steering wheel 210, and a downshift switch 44 in a left end part of the rear surface of the steering wheel 210. The upshift switch 42 is configured to generate the input of the upshift command in the manual mode and the direct mode in which will be described later. Moreover, the downshift switch 44 is configured to generate the input of the downshift command in the manual mode and the direct mode. Thus, the driver who is seated on the driver's seat 202 can easily input the upshift command or the downshift command, while holding the steering wheel 210.

2: Configuration of Shift Control System

FIG. 2 illustrates a block configuration of an automatic transmission 300 provided inside the vehicle 200, and a shift control system 100 which controls a change in a gear stage (a gear change) of the automatic transmission 300. The shift control system 100 is provided with the control unit 50 electrically connected to the automatic transmission 300.

In this embodiment, the control unit 50 is electrically connected to a vehicle speed sensor 60 and an ignition switch 70, in addition to the liquid crystal display 10, the selector part 20, the commander switch 30, the upshift switch 42, and the downshift switch 44, which are described above. Therefore, the control unit 50 outputs the signal including the change command of the gear stage to the automatic transmission 300 based on signals inputted from the liquid crystal display 10, the selector part 20, the commander switch 30, the upshift switch 42, and the downshift switch 44, a vehicle speed signal transmitted from the vehicle speed sensor 60, and an ignition signal transmitted from the ignition switch 70.

The control unit 50 includes an automatic transmission mode control module 52, a manual transmission mode control module 54, and a mode selection module 56. The control unit 50 is comprised of a processor 51, memory, interface, etc. and is configured to execute the various modules stored as software in the memory to perform their respective functions.

When the select lever 22 of the selector part 20 is at the range position of the drive range, the automatic transmission mode control module 52 sets the shift control system 100 to an automatic transmission mode in which the gear stage of the automatic transmission 300 is automatically switched. When the shift control system 100 is set to the automatic transmission mode, the automatic transmission mode control module 52 automatically switches the gear stage of the automatic transmission 300 based on signals related to the traveling state of the vehicle 200 transmitted from the vehicle speed sensor 60 and an engine load sensor (not illustrated), and an algorithm for determining an appropriate gear stage according to the traveling state of the vehicle 200.

When the upshift switch 42 or the downshift switch 44 is turned on while the shift control system 100 is set to the automatic transmission mode, the manual transmission mode control module 54 sets the shift control system 100 to the manual mode (first manual mode) or the direct mode (second manual mode) in which the gear stage of the automatic transmission 300 is switched according to the inputted upshift command or downshift command.

When the shift control system 100 is set to the manual mode, the manual transmission mode control module 54 switches and maintains the gear stage of the automatic transmission 300 according to the inputted upshift command or downshift command. For example, when the shift control system 100 is set to the automatic transmission mode and the gear stage is switched to the third gear, the shift control system 100 is set to the manual mode by once turning on the upshift switch 42 to switch the gear stage to the fourth gear, or the shift control system 100 is set to the manual mode by once turning on the downshift switch 44 to switch the gear stage to the second gear.

When the shift control system 100 is set to the direct mode, the manual transmission mode control module 54 switches the gear stage of the automatic transmission 300 according to the inputted upshift command or downshift command, and then sets the shift control system 100 to the automatic transmission mode when a given resuming condition is satisfied.

The resuming condition in this embodiment is that, when the shift control system 100 is set to the direct mode, the speed of the vehicle 200 exceeds a given value (e.g., 20 km/h) and then becomes 0 km/h so that the vehicle 200 stops. Thus, for example, in a state where the driver who is seated on the driver's seat 202 of the vehicle 200 sets the shift control system 100 to the automatic transmission mode, and the vehicle 200 is stopped, when he/she is going to perform the second-gear start only for the next start, he/she turns on the upshift switch 42 to set the shift control system 100 to the direct mode and switch the gear stage of the automatic transmission 300 to the second gear. As a result, the vehicle 200 is now able to perform the second-gear start. Then, when the vehicle 200 stops again, the shift control system 100 automatically resumes the automatic transmission mode from the direct mode. Therefore, it does not require the driver to perform an operation for resuming the automatic transmission mode.

In this embodiment, when the shift control system 100 is set to the manual mode or the direct mode, the control unit 50 sets the shift control system 100 to the automatic transmission mode by the upshift switch 42 or the downshift switch 44 continuing being turned on for a given period of time (e.g., two seconds or more). Therefore, the driver can freely select the mode of the shift control system 100.

The mode selection module 56 selects in advance or reserves either the manual mode or the direct mode to be set to the shift control system 100 by the manual transmission mode control module 54.

Figure 4:
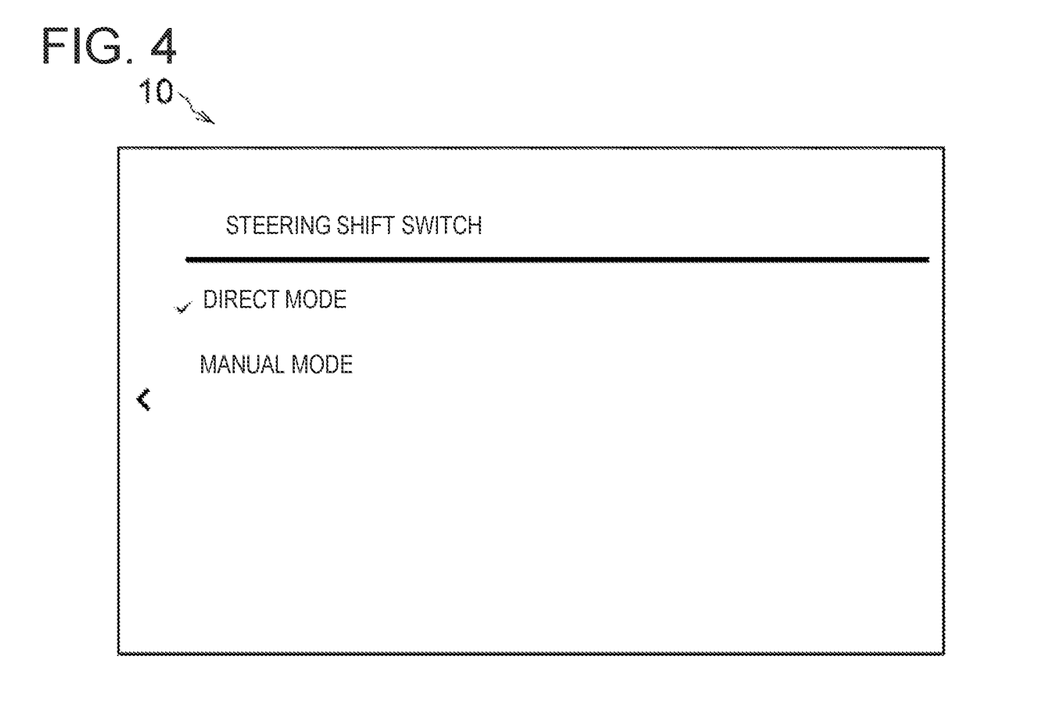
FIG. 4 is a mode selection screen displayed on a display unit illustrated in FIG. 1.

In this embodiment, the liquid crystal display 10 displays the mode selection screen by the home screen switch 34 of the commander switch 30 being turned on to display the home screen, and the commander knob 32 being then operated in this state to select an icon of the "steering shift switch" (see FIG. 4). In the mode selection screen, an icon of the manual mode or an icon of the direct mode is selected by tilted the commander knob 32 in the front-and-rear direction of the vehicle 200, and the commander knob 32 is then depressed so that the selected mode is transmitted to the mode selection module 56. The mode selection module 56 receives the mode selected in the mode selection screen and determines in advance the selected mode to be set to the shift control system 100 by the manual transmission mode control module 54, when the upshift switch 42 or the downshift switch 44 is turned on.

3: Mode Selection

Figure 5:
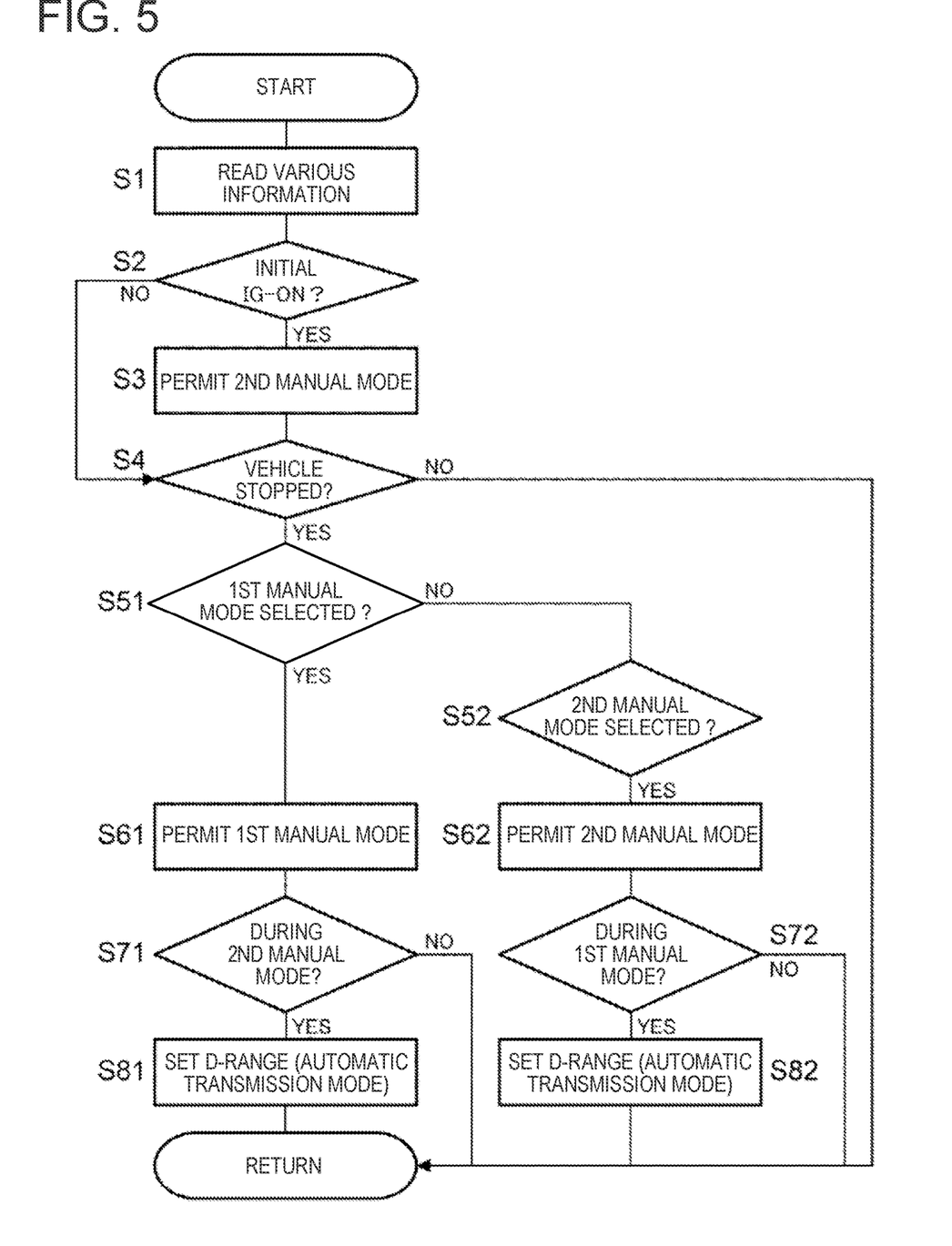
FIG. 5 is a mode selection flowchart of the shift control system illustrated in FIG. 1.

FIG. 5 illustrates a flowchart when the driver who is seated on the driver's seat 202 operates the commander switch 30 to select in advance or reserve the mode to be set to the shift control system 100. The control unit 50 of the shift control system 100 controls the automatic change of the gear stage of the automatic transmission 300 in the automatic transmission mode, or the manual change of the gear stage of the automatic transmission 300 in the manual mode or the direct mode, separately in parallel to the flow in FIG. 5.

At Step S1 in FIG. 5, the control unit 50 of the shift control system 100 acquires varieties of information, such as the range position signal of the select lever 22 sent from the selector part 20, the mode of the shift control system 100 at the timing of Step S1 (any one of the automatic transmission mode, the manual mode, and the direct mode), the vehicle speed signal transmitted from the vehicle speed sensor 60, and the ignition signal transmitted from the ignition switch 70. These varieties of information are acquired at every given period.

At this time, the control unit 50 determines whether the ignition switch 70 is turned on, based on the acquired ignition signal (Step S2). If the ignition switch 70 is turned on (when branching to YES at Step S2), the mode selection module 56 of the control unit 50 determines in advance the direct mode to be set to the shift control system 100, when the upshift switch 42 or the downshift switch 44 is turned on (Step S3).

After the mode selection module 56 determines at Step S3 in advance the direct mode to be set to the shift control system 100, or if the ignition switch 70 is not turned on (when branching to NO at Step S2), the control unit 50 determines whether the vehicle 200 is stopped, based on the acquired vehicle speed signal (Step S4). If the vehicle 200 is not stopped (when branching to NO at Step S4), the control unit 50 returns this flow to Step S1.

If the vehicle is stopped (when branching to YES at Step S4), the driver can operate the commander switch 30 to display the mode selection screen illustrated in FIG. 4 on the liquid crystal display 10, and decide whether to select the icon of the manual mode (Step S51). Here, the driver may select the icon of the direct mode (Step S52), without selecting the icon of the manual mode (after branching to NO at Step S51).

If the driver selects the icon of the manual mode on the mode selection screen (when branching to YES at Step S51), the mode selection module 56 selects in advance the manual mode to be set to the shift control system 100 (Step S61), when the upshift switch 42 or the downshift switch 44 is turned on. On the other hand, if the driver selects the icon of the direct mode on the mode selection screen, the mode selection module 56 selects in advance the direct mode to be set to the shift control system 100 (Step S62), when the upshift switch 42 or the downshift switch 44 is turned on.

At Step S61, after the mode selection module 56 selects the manual mode to be set to the shift control system 100, the control unit 50 determines whether the shift control system 100 is set to the direct mode (Step S71). If the shift control system 100 is set to the direct mode (when branching to YES at Step S71), the control unit 50 sets the shift control system 100 to the automatic transmission mode (Step S81).

On the other hand, if the shift control system 100 is set to the manual mode (when branching to NO at Step S71), since the driver has no intention to change the mode of the shift control system 100, the control unit 50 maintains the shift control system 100 in the manual mode, and it returns the flow to Step S1.

Moreover, at Step S62, after the mode selection module 56 selects the direct mode to be set to the shift control system 100, the control unit 50 determines whether the shift control system 100 is set to the manual mode (Step S72). If the shift control system 100 is set to the manual mode (when branching to YES at Step S72), the control unit 50 sets the shift control system 100 to the automatic transmission mode (Step S82). On the other hand, if the shift control system 100 is set to the direct mode (when branching to NO at Step S72), since the driver has no intention to change the mode of the shift control system 100, the control unit 50 maintains the shift control system 100 in the direct mode, and it returns the flow to Step S1.

At Steps S81 and S82, the control unit 50 returns this flow to Step S1 after the shift control system 100 is set to the automatic transmission mode.

As described above, according to the flowchart of this embodiment, the mode selection module 56 selects in advance the direct mode to be set to the shift control system 100, when the ignition switch 70 is turned on. Therefore, the driver can easily operate the vehicle 200 in the direct mode in which the complicated operation is not need (i.e., the mode is automatically returned to the automatic transmission mode).

4: Other Embodiments

In the above embodiment, the mode selection module 56 determines in advance the mode to be set, by the driver selecting the icon on the mode selection screen displayed on the liquid crystal display 10 by using the commander switch 30. However, for example, as long as the liquid crystal display is a contact-type touch panel, the mode to be set may be determined in advance, by the driver pushing with the finger the icon in the mode selection screen displayed on the contact-type touch panel. Thus, a contact-type touch panel is one example of a mode input device.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

| DESCRIPTION OF REFERENCE CHARACTERS | |
|---|---|
| 100: | Shift Control System |
| 56: | Mode Selection Module |
| 70: | Ignition Switch |
| 200: | Vehicle |
| 300: | Automatic Transmission |

What is claimed is:

1. A shift control system for an automatic transmission, mounted on a vehicle configured to be started by an ignition switch being turned on, where one of an automatic transmission mode and a manual transmission mode is selectively set, comprising:
  a shift switch through which a manual transmission command for arbitrarily changing a gear stage of the automatic transmission can be inputted in the manual transmission mode, the manual transmission mode including:
    a first manual mode in which the gear stage is changed and maintained by inputting the manual transmission command using the shift switch; and
    a second manual mode in which the automatic transmission mode is resumed by satisfying a resuming condition after the gear stage is changed; and
  a controller configured to select in advance either one of the first manual mode and the second manual mode to be set, the controller selecting in advance the second manual mode to be set to the automatic transmission when the ignition switch is turned on.

2. The shift control system of claim 1, wherein the resuming condition is that a speed of the vehicle becomes a given value, while the shift control system is set to the second manual mode.

3. The shift control system of claim 2, wherein the shift switch includes a switch provided on a left side and a switch provided on a right side of a steering wheel of the vehicle, and one of the switches shifts up the gear stage, while the other switch shifts down the gear stage.

4. The shift control system of claim 3, further comprising a mode input device including a commander switch and a display unit,
  wherein when an icon of the first manual mode or the second manual mode displayed on the display unit is selected by the commander switch being operated to input the manual transmission command into the shift switch, the controller selects in advance the first manual mode or the second manual mode to be set.

5. The shift control system of claim 3, further comprising a mode input device including a contact-type touch panel,
  wherein, by an icon of the first manual mode or the second manual mode displayed on the touch panel being pushed directly to input the manual transmission command into the shift switch, the controller selects in advance the first manual mode or the second manual mode to be set.

6. The shift control system of claim 4, wherein when the shift control system is set to either one of the first manual mode and the second manual mode, the shift control system is set to the automatic transmission mode by the shift switch continuing inputting for a given period of time.

7. The shift control system of claim 5, wherein when the shift control system is set to either one of the first manual mode and the second manual mode, the shift control system is set to the automatic transmission mode by the shift switch continuing inputting for a given period of time.

8. The shift control system of claim 1, wherein the shift switch includes a switch provided on a left side and a switch provided on a right side of a steering wheel of the vehicle, and one of the switches shifts up the gear stage, while the other switch shifts down the gear stage.

9. The shift control system of claim 1, further comprising a mode input device including a commander switch and a display unit,
  wherein when an icon of the first manual mode or the second manual mode displayed on the display unit is selected by the commander switch being operated to input the manual transmission command into the shift switch, the controller selects in advance the first manual mode or the second manual mode to be set.

10. The shift control system of claim 1, further comprising a mode input device including a contact-type touch panel, wherein, by an icon of the first manual mode or the second manual mode displayed on the touch panel being pushed directly to input the manual transmission command into the shift switch, the controller selects in advance the first manual mode or the second manual mode to be set.

11. The shift control system of claim 2, further comprising a mode input device including a commander switch and a display unit, wherein when an icon of the first manual mode or the second manual mode displayed on the display unit is selected by the commander switch being operated to input the manual transmission command into the shift switch, the controller selects in advance the first manual mode or the second manual mode to be set.

12. The shift control system of claim 2, further comprising a mode input device including a contact-type touch panel, wherein, by an icon of the first manual mode or the second manual mode displayed on the touch panel being pushed directly to input the manual transmission command into the shift switch, the controller selects in advance the first manual mode or the second manual mode to be set.

13. The shift control system of claim 2, wherein when the shift control system is set to either one of the first manual mode and the second manual mode, the shift control system is set to the automatic transmission mode by the shift switch continuing inputting for a given period of time.

14. The shift control system of claim 3, wherein when the shift control system is set to either one of the first manual mode and the second manual mode, the shift control system is set to the automatic transmission mode by the shift switch continuing inputting for a given period of time.

15. The shift control system of claim 8, further comprising a mode input device including a commander switch and a display unit, wherein when an icon of the first manual mode or the second manual mode displayed on the display unit is selected by the commander switch being operated to input the manual transmission command into the shift switch, the controller selects in advance the first manual mode or the second manual mode to be set.

16. The shift control system of claim 8, wherein when the shift control system is set to either one of the first manual mode and the second manual mode, the shift control system is set to the automatic transmission mode by the shift switch continuing inputting for a given period of time.

17. The shift control system of claim 9, wherein when the shift control system is set to either one of the first manual mode and the second manual mode, the shift control system is set to the automatic transmission mode by the shift switch continuing inputting for a given period of time.

18. The shift control system of claim 10, wherein when the shift control system is set to either one of the first manual mode and the second manual mode, the shift control system is set to the automatic transmission mode by the shift switch continuing inputting for a given period of time.

19. The shift control system of claim 11, wherein when the shift control system is set to either one of the first manual mode and the second manual mode, the shift control system is set to the automatic transmission mode by the shift switch continuing inputting for a given period of time.

20. The shift control system of claim 12, wherein when the shift control system is set to either one of the first manual mode and the second manual mode, the shift control system is set to the automatic transmission mode by the shift switch continuing inputting for a given period of time.

* * * * *